(12) United States Patent
Heckel et al.

(10) Patent No.: US 7,686,217 B2
(45) Date of Patent: Mar. 30, 2010

(54) RETAIL ENVIRONMENT

(75) Inventors: Thomas B. Heckel, Darien, CT (US); Robyn R. Schwartz, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 11/834,134

(22) Filed: Aug. 6, 2007

(65) Prior Publication Data

US 2007/0295560 A1 Dec. 27, 2007

Related U.S. Application Data

(63) Continuation of application No. 11/238,913, filed on Sep. 29, 2005, now Pat. No. 7,357,316.

(51) Int. Cl.
*G06K 15/00* (2006.01)

(52) U.S. Cl. ...................... 235/383; 235/375

(58) Field of Classification Search ............... 235/383, 235/375
See application file for complete search history.

(56) References Cited

U.S. PATENT DOCUMENTS 5,880,449 A * 3/1999 Teicher et al. ............... 235/383
6,035,283 A 3/2000 Rofrano
6,476,858 B1 * 11/2002 Diaz et al. ................... 348/159
6,584,375 B2 6/2003 Bancroft et al.
6,990,463 B2 * 1/2006 Walter et al. ................. 705/16
2002/0139846 A1 * 10/2002 Needham et al. ............ 235/383
2002/0165790 A1 11/2002 Bancroft et al.
2006/0131401 A1 * 6/2006 Do et al. ..................... 235/383

FOREIGN PATENT DOCUMENTS

WO    WO 02/47001 A2    6/2002

* cited by examiner

*Primary Examiner*—Daniel A Hess
(74) *Attorney, Agent, or Firm*—John Pivnichny

(57) ABSTRACT

A retail store has responsive environment apparatus installed which is controlled by processing apparatus. Trigger event sensors coupled to the processing apparatus, are positioned throughout the store. When customers enter and move about the store, the processing apparatus senses various trigger events and in response thereto creates a micro-environment in the vicinity of each customer, catering to the characteristics of that customer. The micro-environment physically moves as the customer moves about the store. The micro-environment is dynamic in that it is engaged in a continual response loop based on the response trigger events of the customer throughout this interactive cycle with the micro-environment.

3 Claims, 2 Drawing Sheets

RETAIL ENVIRONMENT

This is a continuation of application Ser. No. 11/238,913 filed Sep. 29, 2005.

TECHNICAL FIELD

The invention relates generally to methods and systems for use in retail stores which provide a customized micro-environment in the vicinity of individual customers for an enhanced shopping experience. More particularly, the invention relates to use of responsive environment apparatus and trigger event sensors coupled to computer processing capability for tailoring the micro-environment to the individual customer. Even more particularly the invention relates to methods, systems, and services for creating retail store capability for creating temporal event micro-environments triggered by the presence of a unique customer and customized to the context and individualized preferences of the customer.

BACKGROUND OF THE INVENTION

Retail stores operate in a very competitive marketplace involving a wide variety of customer preferences. Retailers try to keep up with a dynamic customer involving fluctuating buying patterns, disloyalty, channel surfing (hunt and gather patterns across retail channels), frustration due to a lack of personal attention, and other customer preference changes. Retailers are also faced with difficulty in assessing their on-hand availability of merchandise, training new personnel in a high turnover business, wasted time in managing and locating inventory, and handling returns. All of the above difficulties lead to overall customer dissatisfaction and deterioration of customer loyalty resulting in lost sales and high operational costs.

Some technological approaches have been developed to address these problems to provide a more competitive retail operation. For example, Bancroft and Ward in U.S. Patent Application US 2002/0165790 A1 describe use of a mobile robot for operation in a retail environment. The robot moves throughout the retail store, monitoring the retail environment and responding to customer requests when a human store clerk is not available. The robot may output information either verbally or in writing based on input from the customer and sales data. U.S. Pat. No. 6,584,375 by Bancroft and Ward describe the robot in further detail.

Pugliese et al. in WIP publication WO 02/47001 A2 describe a system and method for making an on-line store work more like a real, brick and mortar, store. Shoppers initiate an e-sales call with a live sales person who shows them a product via networked live Internet enabled cameras. The live sales person responds to inquiries to demonstrate or display the product in real time. On-line shoppers therefore have an experience that is similar to on-site shopping by interfacing with a live salesperson while being able to view the product from various angles as if they were viewing it in person. Other shoppers may join in the session.

Shopper assistance may also be provided by technological animation of a live sales assistant or the use of voice recognition and voice response capabilities.

Rofrano in U.S. Pat. No. 6,035,283 describes use of a software provided virtual sales person to improve the shopper experience to a user of an electronic catalog.

The patents and applications described above, namely US 2002/0165790 A1, U.S. Pat. No. 6,584,375, U.S. Pat. No. 6,035,283, and WO 02/47001 A2 are all incorporated herein by reference.

Despite these and other developments, there remains significant customer dissatisfaction with current retail operations resulting in lost sales which could be captured by development of an improved retail environment. Retail stores using improved environment capability and techniques will therefore have an advantage in this highly competitive market. It is believed that development of such improvements would constitute a significant advancement in the retail sales acts.

OBJECTS AND SUMMARY OF THE INVENTION

It is therefore a principal object of the present invention to enhance the retail sales arts by providing a retail store with an enhanced retail environment.

It is another object to provide a retail store having a capability for providing a separate micro-environment, customized to each individual customer, that is responsive in nature. Each micro-environment operates in a dialogue with a customer as it acts and reacts to the presence and response actions by the customer in the micro-environment.

It is a further object to provide a retail store wherein enhanced environment capability is possible.

It is yet another object to provide a method of operating a retail store having such enhanced environment capability.

It is yet a further object to provide a method of deploying a retail store solution to a client involving enhanced retail environment capabilities.

These and other objects are attained in accordance with one embodiment of the present invention wherein there is provided a retail store, comprising, a store building having responsive environment apparatus, a plurality of trigger event sensors positioned throughout the store building, and processing means attached to the responsive environment apparatus and the trigger event sensors, for sensing trigger events associated with a plurality of individual customers, and therefrom actuating the apparatus to provide a separate responsive micro-environment customized to each of the plurality of individual customers. The micro-environment is temporal in that it changes with continuing response from the customer trigger events, such as: movements, selection of a given product off of a shelf or display, perception of disinterest or interest as detected by a video camera trigger event sensor.

In accordance with another embodiment of the present invention, there is provided a method of operating a retail store, comprising the steps of, providing responsive environment apparatus in a store building, providing a plurality of trigger event sensors positioned throughout the store building, and sensing trigger events associated with a plurality of individual customers, and therefrom actuating the apparatus to provide a separate micro-environment customized to each of the plurality of individual customers in a dynamic state of responsiveness.

In accordance with yet another embodiment of the present invention, there is provided a method of deploying a retail store solution for a client, comprising the steps of, providing plans for installing responsive environment apparatus in a store building, providing plans for positioning a plurality of trigger event sensors throughout the store building, and providing processing capability attached to the responsive environment apparatus and the trigger event sensors, programmed for sensing trigger events associated with a plurality of individual customers, and therefrom actuating the apparatus to provide a separate micro-environment customized to each of the plurality of individual customers.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
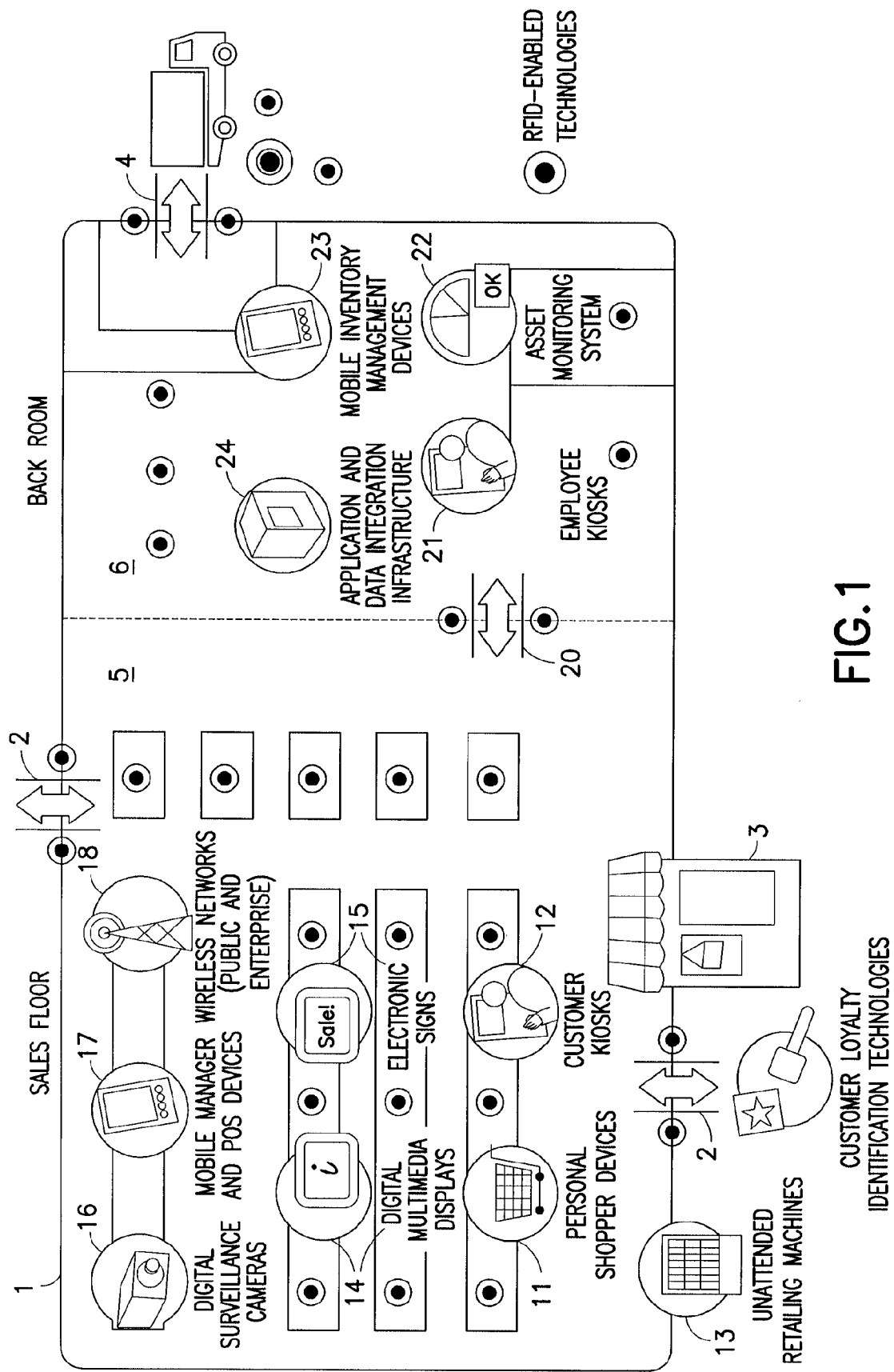
FIG. 1 shows a retail store in accordance with the present invention.

In FIG. 1, there is shown retail store 1 which is normally a building or a part of a building which may have other occupants or uses. The store as shown in FIG. 1 has two entrances 2, but may have any number of entrances where retail customers may enter or leave the store. If an entrance is located along a sidewalk, parking lot, or the like, it may have a door, awning, or other accessories 3 normally associated with retail store entrances. Retail store 1 is divided physically into sales floor 5 and back room 6 portions. Other portions of space within the store 1 may also be present. Additional entrance 4 to back room 6 is used to receive merchandise for sale as for example a loading/unloading dock, or receiving doors 20. Use of RFID readers at entrance 4 improves inventory accuracy, receiving efficiency, and product item traceability by reading pallet and case level RFID tags as shipments arrive. Other tracking technologies may also be used. Entrance 4 is not normally used by customers for entering or leaving the store, but may be used by store employees, delivery personnel, or other workers. Opening 20 is used to move merchandise from back room 6 onto sales floor 5, and for returning the same.

A number of trigger event sensors are positioned throughout the retail store, particularly within sales floor area 5. Trigger event sensors may use motion, light, sound or radio frequency detector techniques. For example, digital surveillance camera 16 may be programmed to detect the presence of a customer in a specific portion, aisle, or the like of sales floor 5 using motion and light techniques known in the art. The customer's size, height, gender, identity, speed of motion, may be detected. RFID (radio frequency identification) tag detectors or other RFID enabled technologies may be used as trigger event sensors.

Trigger event sensors may also be attached to a merchandise rack, a display, whether a multimedia display 14 or a conventional merchandise display. Trigger event sensors may also be attached temporarily or permanently to the product merchandise itself. Trigger event sensors may also be adapted to be manually triggered by a sales associated such as by use of a portable or fixed POS (point of sales) device 17. Other portable or cable attached entry devices, such as a personal digital assistant (PDA), keyboard, mouse, laptop, and the like, known in the art may be used to manually trigger an event.

Unattended retailing machines 13 may be located on sales floor 5 or on the building exterior. Trigger events may also be detected as a customer approaches or uses such retailing machines through use of event sensors mounted on the machines or through use of sensors within the machine that also serve other purposes in the normal machine operation.

Customer kiosks 12 located on sales floor 5 likewise may detect trigger events through event sensors mounted on the kiosk or through use of manual kiosk hardware having other purposes.

Wireless network technologies 18 within store 1 may also detect customer and merchandise position and motion and therefrom detect trigger events.

FIG. 1 also shows use of various technologies within back room 6. Employee kiosks 21 allow store employees to access information stored on processors, servers, or other computing devices. The information may include real time product inventory and location within store 1, product descriptions, customer information, such as demographic data, purchase history, employees within store 1 and their current location, product order status, and expected delivery date and time.

Asset monitoring system 22 monitors condition, status, temperature, humidity, and the like of a controlled storage area, if present, within back room 6. Sales floor staff are notified in the event of a change in the status of the controlled storage area.

Mobile inventory devices 23 are used by store personnel throughout back room 6 as well as sales floor 5 to provide updated inventory data.

The building of retail store 1 is outfitted with responsive environment apparatus. Such apparatus is capable of adjusting the store environment in the immediate vicinity of a specific customer without impacting customers located elsewhere in store 1. Examples of environment apparatus include lighting, sounds, radiant and interactive display technology 15, electronic shelf labels, shopping cart companion devices, and hand-held devices used by the specific customer as well as store clerks.

The immediate vicinity region, known herein as a micro-environment is a temporal environment catered to an individual customer. It is a cocoon environment designed for a one-to-one relationship inside a one-to-many space.

Retail store 1 also includes computer processors, servers, and the like, including application and data integration infrastructure 24. Such processors, servers, etc., may be located anywhere, whether within store 1 or remotely located. If remotely located, telecommunications and networking technologies known in the art provide rapid data transfer at a rate sufficient to make such remote access essentially the same as if the processor were located in store 1.

This processing apparatus is attached to the responsive environment apparatus described above and controls it to create a micro-environment for a customer. It may also create a separate micro-environment for each customer in store 1. The processing apparatus is also attached to the trigger event sensors described above for sensing trigger events associated with each of the individual customers.

The processing apparatus has access to all of the data described herein including, but not limited to customer data, product data, store employee data, past purchases, and the like. Based on the trigger events, the processing apparatus activates the responsive environment apparatus to create a micro-environment for each customer.

Software running on the processing apparatus is configured to sense the trigger events. Such sensing may be performed very simply, for example, by receiving a single digital signal from a microwave proximity detector indicating a customer is positioned within three feet of a custom store display. The sensing may also be complex such as receiving individual frames of a line video capture, and after a certain number of frames are received, processing the video data to sense disinterest or interest in a store item by a customer. Techniques for processing of video data are known in the art, and additional capability is continually being developed. Other types of sensing may be of modest complexity, such as reading the temperature from a temperature sensor.

Those of ordinary skill in the sensor arts will recognize that tradeoffs may be made between processing new sensor data within the sensor itself and processing raw data by the processing apparatus described above.

Software running on the processing apparatus also controls the responsive environment apparatus using known techniques for operation of such apparatus from a digital control source—e.g. the processing apparatus. For example, a heating device may be turned on to raise the air temperature in a micro-environment portion of the retail store.

The micro-environment may cater to the individual customer to drive enhanced customer experiences, improved business operations and sales, and therefore a competitive edge. The customer experience will be characterized by dynamic and responsive environments that respond to real time conditions and provide opt-in customer advantages. The processing apparatus, through use of the trigger events and data described above adjusts the micro-environment including display content to deliver to the customer:

what you need right now how much service you want right now how much information you need to make a decision right now, and how you want it delivered to you how you purchased in the past if you want to be helped in this decision, and how you want to receive that help how you behaved in the past what you purchased in the past, and how that applies to the current position of the store resources Those skilled in the software programming arts will know how to write appropriate software for creating the micro-environment using this specification and for sensing movement of a customer throughout the retail store. The software may then adjust the responsive environment apparatus to cause the micro-environment to appear to "follow" the customer's movement. The software continually receives new trigger events, whether the customer moves or not, and adjusts the micro-environment accordingly in a dynamic, responsive way based on the trigger event, other trigger events, received previously, and any pertinent data as described above.

Figure 2:
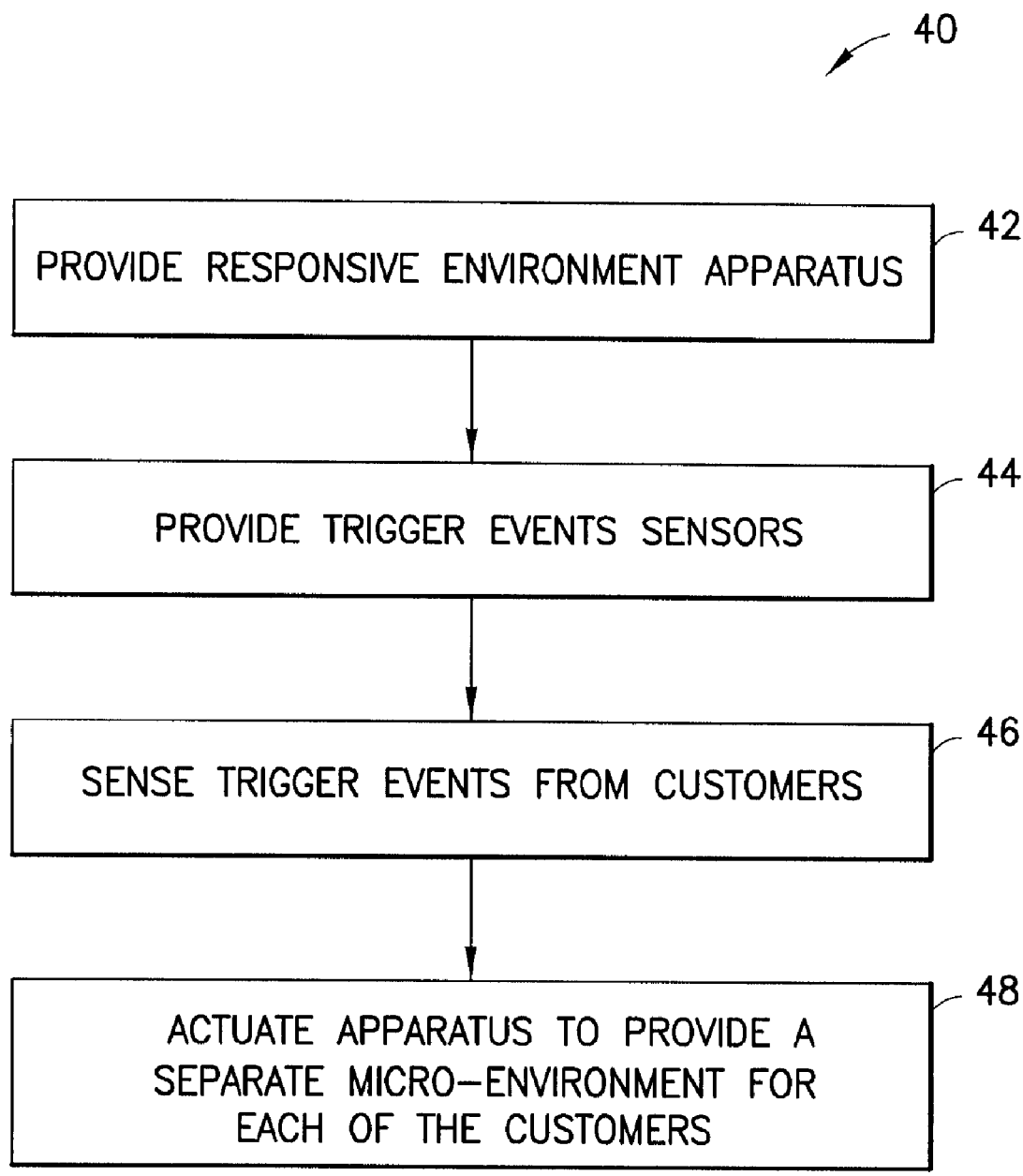
FIG. 2 is a flowchart for operation of a retail store in accordance with the present invention.

In FIG. 2, there is shown flowchart 40 depicting a method of operating a retail store in accordance with the present invention. In step 42, responsive environment apparatus, as described above, is provided in retail store 1. In step 44, trigger event sensors, as described above, are provided in store 1. As customers enter and move about the store various events are triggered and sensed in step 46. In step 48, a micro-environment for each customer is provided by actuating the responsive environment apparatus using the sensed trigger events. As described above, processing apparatus, including various data described above may be used to control the responsive environment apparatus in a manner that caters to the individual customer's conditions, thereby increasing the likelihood of a competitive advantage in sales volume.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of operating a retail store, comprising the steps of:

providing responsive environment apparatus in a store building;

providing a plurality of trigger event sensors positioned throughout said store building, each of said trigger event sensors comprising a motion, light, sound, video, manually triggered, or radio frequency detector;

sensing trigger events associated with a plurality of individual customers, and therefrom actuating said apparatus to provide a separate micro-environment customized to each of said plurality of individual customers and wherein said micro-environment for each of said individual customers moves physically about said store building as the associated individual customer moves about said store building;

wherein said responsive environment apparatus is adapted to enforce a change event in the vicinity of said individual customers; and wherein said change event is selected from the group consisting of temperature changes, audio changes, store associate interaction changes, display of how said individual customer purchased in the past, and display of how said individual customer wants information needed to make a decision, delivered.

2. The method of claim 1, wherein said micro-environment moves about in a manner to remain positioned nearby said associated individual customer.

3. The method of claim 1, further comprising the step of actuating said apparatus using a computer processor programmed to sense said trigger event sensors, access a database of customer experiences driven by business rules, and make actuating decisions therefrom using micro-environment algorithms.

* * * * *